United States Patent [19]

Donnelly

[11] 4,304,106
[45] Dec. 8, 1981

[54] INSTITUTIONAL SERVING TRAY

[76] Inventor: William R. Donnelly, 1237 W. High St., Piqua, Ohio 45356

[21] Appl. No.: 126,035

[22] Filed: Feb. 29, 1980

[51] Int. Cl.³ .............................................. F25D 3/08
[52] U.S. Cl. ..................................... 62/457; 62/530
[58] Field of Search ............... 62/437, 529, 530, 371, 62/372, 457; 165/104 S, DIG. 25, DIG. 26

[56] References Cited

U.S. PATENT DOCUMENTS

| | | | |
|---|---|---|---|
| 2,526,165 | 10/1950 | Smith | 62/457 |
| 2,803,115 | 8/1957 | Shepherd | 62/530 |
| 2,810,276 | 10/1957 | Murray | 62/457 |
| 3,091,091 | 5/1963 | Ferrante | 62/530 X |
| 3,130,288 | 4/1964 | Monaco et al. | 62/457 X |
| 3,269,144 | 8/1966 | Poris | 62/457 |
| 3,383,880 | 5/1968 | Peters | 62/457 |

*Primary Examiner*—Lloyd L. King
*Attorney, Agent, or Firm*—Jerome P. Bloom

[57] ABSTRACT

A tray particularly advantageous for patient feeding in hospitals and like applications including a body having means defining therein a sealed chamber containing a chemical compound or mixture which is one of a group including magnesium nitrate; acetamide; benzoic acid; strontium bromide; napthalene; a mixture of urea and benzoic acid wherein the ratio of benzoic acid to urea is substantially 2 to 1 by weight; a mixture of benzoic acid and benzomide in proportion wherein they are substantially equal by weight; and aluminum potassium sulfate, said one chemical compound or mixture in said chamber embodying chemically combined water in an amount insufficient to provide a total crystallization thereof in the solid state, said one compound or mixture as sealed in said body being repeatedly reversible from a solid to a liquid state and back to a solid state and being distinguished by a transition or phase change temperature which is substantially above 32° F. and below 212° F., and said one chemical compound or mixture being further characterized in that, in cooling the liquid form thereof through its transition or phase change temperature, there is a substantially instantaneous conversion of the liquid to a crystalline and powder form immediately below said transition temperature producing a heat of formation the level of which does not materially fall over a period of time approaching one hour or more, thereby to maintain, in the process, a relatively stable temperature of said body for an extended period of time.

11 Claims, 3 Drawing Figures

U.S. Patent  Dec. 8, 1981  4,304,106
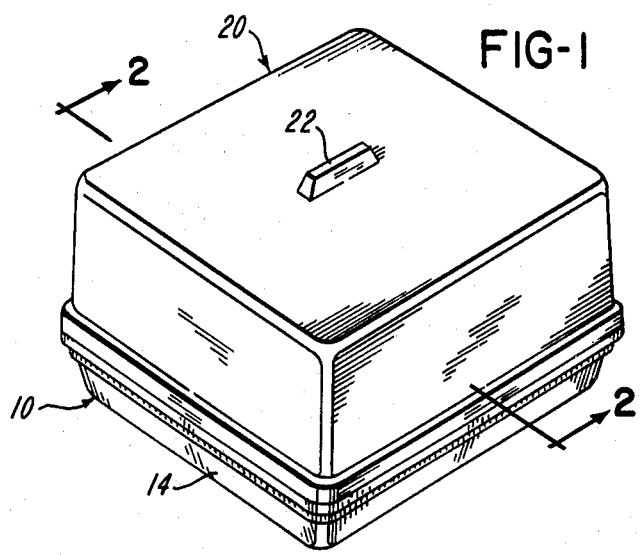
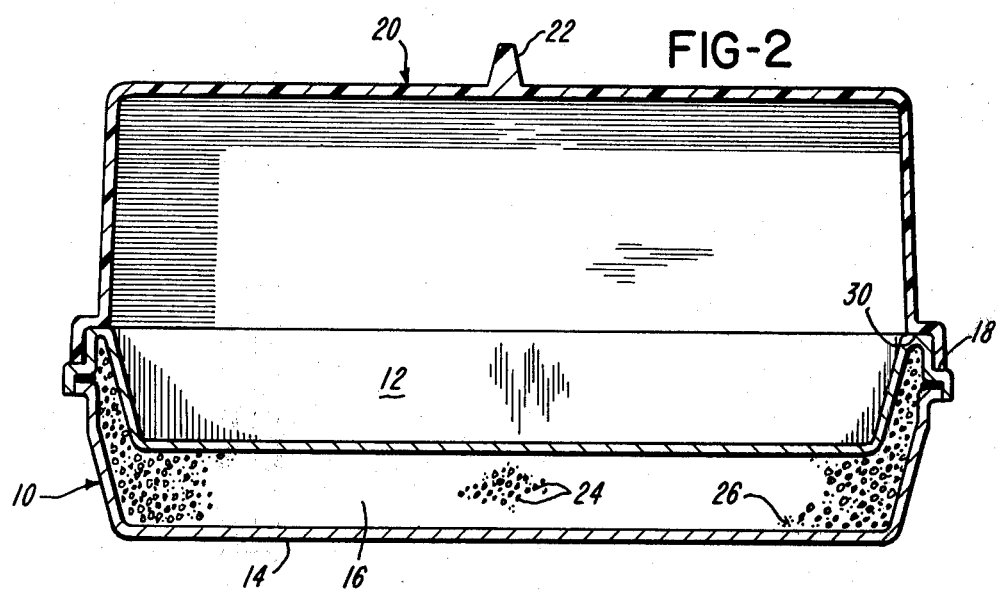
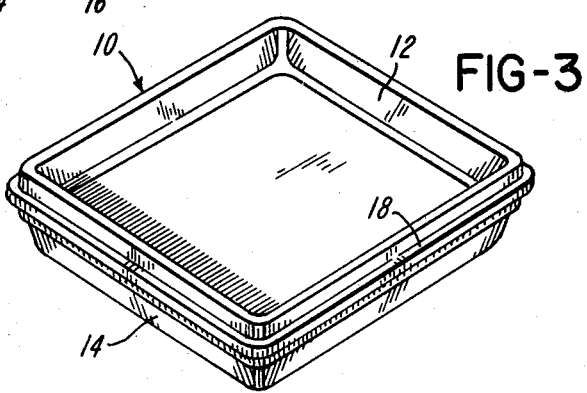

INSTITUTIONAL SERVING TRAY

BACKGROUND OF THE INVENTION

This invention relates to a new and improved serving tray particularly advantageous for use in hospitals and other institutions which must prepare and serve meals on a volume basis and in widely scattered locations within their premises.

A characteristic and important feature of those trays which embody the present invention is their ability to be so used as to substantially maintain the temperature of the food which they carry at or near its serving temperature for close to one hour or more. The invention trays have an ability to quickly absorb heat to condition them for their function. Yet they are distinguished by the characteristic of much more slowly releasing heat.

There have been multitudes of prior art devices designed for use as serving trays the intent of the design of which was in the direction of the achievements of the present invention. However, as far as those substantively involved in the preparation of the present disclosure are aware, no one of these prior art devices has had the distinctive composition, capability or function of embodiments of the present invention.

While the invention will be herein described with reference to a specific embodiment thereof in a food serving tray particularly aimed for high volume use in hospitals, it should be obvious that neither the form of its embodiment nor its application is so limited. Such is certainly not intended.

The problems solved by embodiments of the present invention are particularly in evidence in large hospitals. As such institutions grow, there are ever increasing difficulties in providing the inhabitants who are patients with reasonably hot foods. This stems from the fact that in the first place food must be transported varying distances from a central and a number of satellite serving kitchens. There is often a significant time lapse between the time a tray is filled and it reaches a patient. Further delay may be occasioned by the fact that at the time of delivery a patient may not be immediately ready or available to eat the food. In the latter case, this may necessitate reheating the food when the patient is ready to eat, if such facilities are available. If reheating is not possible then the result is not only unappetizing food being served but food which is unpalatable. The whole scene tends to inherently produce patient complaints and poor nutrition in more cases than one likes to think of. Inherent in the procedure is a waste of energy and manpower and a psychological downgrading of the morale and efficiency of the hospital staff, as well as the morale and well being of patients and the effectiveness of their treatment. All these problems may be alleviated to a visible extent in use of embodiments of the present invention in the form of individual serving trays.

SUMMARY OF THE INVENTION

A preferred embodiment of the present invention provides a tray for use in serving food which is formed of heat conductive material and hollow to define therein a shallow chamber. The shallow chamber is sealed and substantially filled with and only contains, one of a group of chemical compounds and mixtures of chemical compounds, provided originally in a totally crystalline solid state, each which has been modified to remove 1% to 5% of its original chemically combined water. The compounds and mixtures of compounds included in this group are limited in number and consist of magnesium nitrate; acetimide; benzoic acid; strontium bromide; naphthalene; a mixture of urea and benzoic acid wherein the ratio of benzoic acid to urea is substantially 2 to 1 by weight; a mixture of benzomide and benzoic acid in proportion wherein they are substantially equal by weight, there being slightly more benzomide; and aluminum potassium sulfate.

The expression "modified compound" as hereinafter employed, shall mean the form of a listed chemical compound or mixture as modified per the present invention to provide that the amount of its combined water is insufficient to produce a total crystallization of its substance in its solid state.

Each compound, modified per the present invention, in the form in which it is sealed in the tray of which it forms a part is stored preliminary to its use in a solid state under which condition a major portion of its substance is crystalline and a very minor portion of its substance appears in an essentially powder form. The so modified compound is in each case found to be self-nucleating in use for the purposes herein described.

The modified compounds and mixtures per the invention have further common critical characteristics as follows. Each will liquify at a temperature level which is substantially above 32° F. but below 212° F. It is characterized by an ability to effectively take on and store heat in the liquid state without deterioration when exposed to temperatures up to about 210° F. In the cooling and transition of each from a liquid to a solid state, as the liquid commences its phase change, portions of both crystal and powder form appear substantially simultaneously. The first formed powder particle serves as a nucleating agent propagating crystallization and producing crystals which uniquely differ, one from the other, in structural configuration. An unexpected consequence of the use of a compound or mixture of compounds modified per the invention as described is the production of heat of formation in the solidifying process the nature of which is such to provide a relatively slow and stable release of heat the temperature of which does not materially fall for as much as one hour or more. The relatively uniform elevated temperature of heat so provided enables that hot food deposited on the tray at simmering temperature and covered by a cap made of material which has little if any heat conductive capability will have its then existing temperature substantially maintained for an extended period of time without significant drop.

The stated parameters and bounds as well as the characteristic properties and behavior of the modified chemical compounds and mixtures of chemical compounds as specified provide that, as long as they are individually sealed in the tray in which they are originally embodied, they may be repeatedly and easily liquified to store heat and solidified to produce the results described, enabling the provision of a food serving tray uniquely suited to solving the problems first stated.

A primary objective of the invention, therefore, is to provide an improved serving tray especially advantageous for use in hospitals and institutions which is economical to fabricate, more efficient and satisfactory in use and adaptable to a variety of serving conditions or requirements.

A further object is to provide a hollow heat conductive serving tray the hollow of which is substantially filled with a chemical compound or mixture of chemical compounds which liquifies upon the tray being subjected to heat, to store heat therein, and in the cooling thereof converts to solid particles of both crystalline and powder form in a manner to produce a relatively stable and uniform heat of formation which is slowly released, without significant drop as to its level for an extended period of time, enabling thereby that hot food deposited on the tray and capped by a non-conductive cover may have the temperature thereof substantially maintained for up to one hour and more.

A further object is to provide a serving tray comprised as above described wherein a heat storing and heat releasing chemical compound or mixture of chemical compounds contained therein is self-nucleating and capable of repeated conversion to liquid and back to solid form without deterioration of the properties with which it is endowed.

An additional object is to provide a serving tray and constituents thereof possessing the advantageous features and components, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein one but not necessarily each and every application of the invention is illustrated, FIG. 1 illustrates a perspective side elevational view of a tray per the present invention including a dome-shaped cover for the tray;

FIG. 2 is a cross sectional view of the structure shown in FIG. 1 to illustrate the disposition of a chemical compound per the invention in the hollow of the tray; and FIG. 3 is a perspective view of the tray taken from the top thereof, with its cover removed.

Like parts are indicated by similar characters of reference throughout the several views.

The illustrated serving tray comprises a hollow rectangular tray structure 10 capped by a dome-shaped cover 20. At the top center of the cover 20 is a perpendicularly projected hand hold 22 to which the fingers may be applied for its removal.

As shown tray 10 is comprised of an upper plate 12 and a lower plate 14, each preferably formed of stainless steel. Each plate has the form of a generally rectangular dish the upper surface of which is recessed to provide the major portion thereof as a central rectangular base rimmed at its periphery by a shallow upstanding wall the upper edge of which has a coextensive external flange 18. The depth of the upstanding wall portion of the upper plate 12 is less than that of the similar portion of the lower plate 14. The plate 12 is sized and shaped to nest in the lower plate 14 so as to have the external flange bounding the upper edge of its upstanding wall portion seat on and in overlapping relation to the external flange bounding the upper edge of the upstanding wall portion of the plate 14, whereupon these flanges are welded together.

Except for their bounding uppermost flange portions, the respective base and upstanding wall portions of the plates 12 and 14 are spaced to define therebetween a hollow, forming a chamber 16.

The chamber 16 is very shallow and has a relatively uniform depth. It is, moreover, hermetically sealed and filled with and only contains, one of a group of chemical compounds and mixtures of chemical compounds, provided originally in a totally crystalline solid state, which has been modified to remove 1% to 5% of its original chemically combined water. The compounds and mixtures of compounds included in this group are limited in number and consist of magnesium nitrate; acetamide; benzoic acid; strontium bromide; naphthalene; a mixture of urea and benzoic acid wherein the ratio of benzoic acid to urea is substantially 2 to 1 by weight; a mixture of benzomide and benzoic acid in proportion wherein they are substantially equal by weight, there being slightly more benzomide; and aluminum potassium sulfate.

When the tray unit of the invention is originally assembled and the selected modified compound or mixture is introduced therein it will be or convert to a solid state, in which condition the solid form thereof will be predominantly crystalline in character. A very minor portion of the solid will be present in an essentially powder form. This derives from the fact that while the chemical substance embodies chemically combined water, per the present invention it will be from 1 to 5% less than that which is required for a totally crystalline form thereof in the solid state.

Each of the specified modified compounds and mixtures has the characteristic of having a phase change or transition temperature in a range between 170° and 195° F. Each also features an ability to rapidly absorb heat while at the same time is distinguished by the production of a heat of formation as it is converted from a liquid to a solid state which is given up quite slowly. As it converts from liquid to solid and moves through its phase change or transition temperature it is self-nucleating and the heat of formation which evolves is given off so slowly and the temperature level of the tray in which it is embodied maintains so well that within an hour or so following the movement through the transition temperature the temperature of the tray will not normally vary or drop perceptibly more than 10° or 15° at the most. Note should be taken that the transition or phase change temperatures of the prescribed compounds and mixtures as modified and utilized per the present invention range from about 170° F. to 195° F. These physical attributes lend themselves admirably to the achievement of the benefits of the present invention, particularly as related to the embodiment thereof in hospital serving and like trays for warming and maintaining the temperature of hot food.

For an exemplary illustration of a most preferred embodiment of the invention, consider the following.

The preferred modified chemical compound of the list prescribed herein enabling the practice of the invention is a magnesium nitrate compound. To achieve the invention, $MgNO_3.6H_2O$ which is a totally crystalline form of magnesium nitrate is first modified in a liquifying process to remove about 5% of its water content. It is this modified form of the magnesium nitrate with which the chamber 16 is substantially filled to provide a most preferred embodiment of a serving tray. This liquified modification of the chemical compound is introduced to the chamber 16, for example by way of a hole made in the base of the tray 10 which is then plugged and sealed. It is required that the chemical compound within the chamber 16 be hermetically sealed. The tray unit so provided is then stored for subsequent shipment and as exposed to room temperature the liquid form thereof converts totally to a solid state the major portion of the substance of which is crystalline and a very minor portion of which has an essentially powder form. The solidifying is totally due to the self nucleating characteristic of the compound induced by reason of the modification of the original totally crystalline magnesium nitrate.

When used in the hospital, the tray 10 is made ready for use by a form of storage in which it is immersed in hot water the temperature of which will preferably range from 200° to 212° F. The immersion prior to use should be for a period of at least about 30 minutes. The immersion may continue for a longer period of time if circumstances so dictate. When the tray is immersed, the solid modified magnesium nitrate compound is found to rapidly liquify, the liquification occurring as its temperature and that of the tray 10 rises to about 193° F. and moves higher. In the liquifying process the compound will absorb substantial amounts of heat. At the time a tray 10 is required for use, it is removed from the water and hot food is then deposited on its dished upper surface. A normal and desirable temperature of the food when served and placed on the tray will range from about 160° to about 180° F. The tray and the food thereon is then immediately capped by application of the dome-shaped cover 12 in a manner believed obvious.

As the tray is extracted from the hot water and exposed to normal room temperatures it commences to cool. When it reaches and starts to pass through its transition or phase change temperature, which is 193° F., the liquid of the compound commences to convert to a solid state. Immediately of the transition temperature it is found in use of the compound that both crystals and powder particles immediately result and the first powder particle which appears serves as a nucleating agent to substantially instantaneously propagate and produce a total conversion of the liquid to predominantly crystal and minimally a powder form. The crystals occurring are distinguished by a diverse and varied configuration.

An unexpected result of this happening is the development of heat of formation in a manner that the heat is stable and relatively uniform. The stability and uniformity is such that it will be as much as one hour or more following the reaching by the liquid of its transition or phase change temperature before the temperature of the hermetically sealed-in compound and the tray 10 in which it is embodied drops much more than 10°. The heat of formation continues to be given off subsequent to this as it very slowly reduces to room temperature. The whole process is unique in that in spite of extremely rapid liquification the compound will on a reverse cycling give off the heat of formation quite slowly.

The precise involvement of what takes place or the reason for the unexpected and highly desirable results cannot be explained but the facts are nevertheless as stated.

Note that per the present invention, whether the modified magnesium nitrate is used or the other modified chemical compounds or mixtures are used there are comparable results and nothing need be added or done in respect to the sealed-in chemical compound or mixture to enable its function in a manner and under conditions such as described.

In the case of each of the listed compounds and mixtures they are therefore individually functional as required.

The tremendous benefits of the discovery set forth above should be self-evident and they are as first stated. They enable a substantial reduction of the logistics involved in patient feeding in hospitals. Consequently the stress and concern normally occurring in this process is caused to substantially disappear. Patients are better fed, will tend to eat better and will have a morale, the result of which will be to lessen the burden on the hospital staff, since all parties will then better relate.

The noted advantages are enhanced by the inherent saving of time and money occasioned in the serving procedure.

It will be seen from the foregoing that, in all its simplicity, the invention has produced unobvious results. It has been achieved, moreover, by starting with known chemical compounds or mixtures which normally are provided in the solid and totally crystalline form and introducing the first factor of the invention by removing therefrom a minor percentage of the chemically contained water. This is, of course, insufficient to achieve the invention and the second essential factor discovered and developed was the application of the chemical compound or mixture selected from the specified group in a sealed chamber in a body or tray having heat conductive properties. The inobvious consequence, as far as the prior art is concerned, was that the sealing of the chemical compound or mixture of the class specified in a heat conductive body rendered the same completely reversible between a liquid and a solid state without the addition of a foreign substance and without deterioration of the then endowed physical properties and structure of the chemical compound or mixture so provided. More than this, the result found in the use of the invention embodiment is that the modified chemical compound or mixture is endowed with the property of a substantially instantaneous conversion to a crystalline and powder form when passing from the liquid to the solid state. Further, when the temperature is immediately below the transition or phase change temperature there are produced unexpected and highly beneficial results in the nature of a remarkably extended evolvement of the heat of formation, the consequence is to produce a temperature of the body or tray in which the chemical is embodied which does not fall much more than 10° F. for a period of time approaching one hour or more subsequent to the initiation of phase change. The distinctive properties of the modified compounds and mixtures per the present invention include a most rapid absorption of heat with a sharply contrasted extremely slow evolvement of heat of formation in the solidifying process. Attention is directed again to the fact that in the solid state the medium sealed in the chamber 16 in the example illustrated will be comprised predominantly of crystals 24 and to a very minor degree of particles 26 having a powder-like substance.

Under any normal conditions, the medium sealed in the tray or other body which serves as a heat transmitting and absorbing vehicle in the use of an invention embodiment will normally, when provided for the user, be in the solid form just described.

With reference to the heating to liquify the contents of the tray described, the procedure for heating is a matter of choice.

Attention is directed to the fact that the tray per the present invention may be made of material capable of withstanding and transmitting microwaves. In such case the tray 10, so fabricated, and embodying a sealed-in chemical compound or mixture such as previously specified, may have food placed therein for its initial preparation. On placing the so-filled tray in a microwave oven, for example, the microwaves will not only cook the food but liquify the sealed-in chemical. When the tray is removed from the oven and exposed to room temperature and the temperature thereof reduces to the phase change temperature of the embodied chemical, the self-nucleating function thereof comes into play as solidification is initiated. This is as previously described.

On occasion where the action is to be expedited, one may use ultrasonics to trigger the self-nucleation.

While the tray unit set forth is shown in a particular form, the inventive concepts embodied therein may be likewise applied to the form of a pizza tray, a soup bowl and for that matter have any configuration and may even be per se a container and still be utilized and function in a similar manner. The device serving as an embodiment of the invention obviously need not be a serving tray.

A most remarkable aspect of a product per the present invention is its normal continuous capability to serve its intended function.

It should be understood that the preferred mediums in the form of chemical compounds or mixture have been set forth. Moreover, they are unique in respect to their property and function and unobvious as to their results in respect to the application herein described. It should be understood, however, that the basic concepts of the present invention may be also employed in lesser capacity utilizing other chemical compounds or mixtures providing they are characterized by similar physical properties and further providing that they are sealed for use within a body heat conductive at least in part.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

I claimed:

1. A tray particularly advantageous for patient feeding in hospitals and like applications including a body having means defining therein a sealed chamber containing a chemical compound or mixture which is one of a group including magnesium nitrate; acetamide; benzoic acid; strontium bromide; naphthalene; a mixture of urea and benzoic acid wherein the ratio of benzoic acid to urea is substantially 2 to 1 by weight; a mixture of benzoic acid and benzomide in proportion wherein they are substantially equal by weight; and aluminum potassium sulfate, said one chemical compound or mixture in said chamber embodying chemically combined water in an amount insufficient to provide a total crystallization thereof in the solid state, said one compound or mixture as sealed in said body being repeatedly reversible from a solid to a liquid state and back to a solid state and being distinguished by a transition or phase change temperature which is substantially above 32° F. and below 212° F., and said one chemical compound or mixture being further characterized in that, in cooling the liquid form thereof through its transition or phase change temperature, there is a substantially instantaneous conversion of the liquid to a crystalline and powder form immediately below said transition temperature producing a heat of formation the level of which does not materially fall over a period of time approaching one hour or more, thereby to maintain, in the process, a relatively stable temperature of said body for an extended period of time.

2. A heating or warming device comprising a body, heat conductive at least in part, having defined therein a sealed chamber, said chamber containing a chemical compound or mixture characterized in the solid form by a predominant portion of crystalline configuration and a minor portion of essentially powder form and an ability to liquify at a temperature below 212° F. and having the property of being reversible from the liquid form and being adapted to solidify, on cooling, to its original solid state as sealed in said body, said chemical compound or mixture being the sole contents of said chamber and having the properties lending it the capability of being repeatedly cycled between a solid and a liquid state without perceptible alteration of its properties, said chemical compound or mixture being distinguished by the embodiment therein of chemically combined water the amount of which is from 1 to 5% less than that required to produce a total crystallization thereof in a solid state and further characterized by the additional property in cooling from a liquid state through its phase change temperature to substantially instantaneously produce both crystalline and powder particles thereof propagating immediate and total solidification and evolving a heat of formation the temperature level of which, approaching a period of one hour and more from the time the phase change temperature is reached, does not materially drop much more than about 10° to ·15°.

3. A device as in claim 1 wherein the phase change temperature of said one compound or mixture is in a range between 170° and 195° F.

4. A device as in claim 1 wherein said chamber is a shallow chamber substantially uniform in depth.

5. A device as in claim 1 wherein said one compound or mixture is comprised, in the solid state thereof, predominantly of crystals exhibiting a diversity of configuration and a minor amount of a powder-like substance.

6. A device as in claim 1 wherein said one compound or mixture exhibits a heat of formation in phase change from liquid to solid which evolves much more slowly than heat is absorbed to produce a phase change thereof from solid to liquid.

7. A device as in claim 1 wherein said one compound or mixture exhibits a heat of formation in transition from a liquid to a solid state producing a temperature thereof which does not materially drop more than 10° to 15° F. within a period of one hour or more following the initiation of its phase change and then the heat of formation still continues to evolve for an extended period thereafter.

8. A device as in claim 2 wherein the phase change temperature of said one compound or mixture is in a range between 170° and 195° F.

9. A device as in claim 2 wherein said one compound or mixture is comprised, in the solid state thereof, predominantly of crystals exhibiting a diversity of configuration and a minor amount of a powder-like substance.

10. A device as in claim 2 wherein said one compound or mixture exhibits a heat of formation in phase change from liquid to solid which evolves much more slowly than heat is absorbed to produce a phase change thereof from solid to liquid.

11. A device as in claim 2 wherein said one compound or mixture exhibits a heat of formation in transition from a liquid to a solid state producing a temperature thereof which does not materially drop more than 10° to 15° F. within a period of one hour or more following the initiation of its phase change and then the heat of formation still continues to evolve for an extended period thereafter.

* * * * *